(12) United States Patent
Kim et al.

(10) Patent No.: US 9,723,474 B2
(45) Date of Patent: Aug. 1, 2017

(54) DETECTION SIGNAL TRANSMISSION METHOD AND USER EQUIPMENT FOR PROXIMITY COMMUNICATION

(71) Applicant: LG Electronics Inc., Seoul (KR)

(72) Inventors: Laeyoung Kim, Seoul (KR); Jinsook Ryu, Seoul (KR); Hyunsook Kim, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/107,765

(22) PCT Filed: Jan. 5, 2015

(86) PCT No.: PCT/KR2015/000054
§ 371 (c)(1),
(2) Date: Jun. 23, 2016

(87) PCT Pub. No.: WO2015/102444
PCT Pub. Date: Jul. 9, 2015

(65) Prior Publication Data
US 2016/0330604 A1    Nov. 10, 2016

Related U.S. Application Data

(60) Provisional application No. 61/923,641, filed on Jan. 4, 2014, provisional application No. 62/019,386, filed on Jun. 30, 2014.

(51) Int. Cl.
*H04W 72/10* (2009.01)
*H04W 8/00* (2009.01)
(Continued)

(52) U.S. Cl.
CPC .......... *H04W 8/005* (2013.01); *H04W 4/025* (2013.01); *H04W 72/10* (2013.01); *H04W 74/00* (2013.01);
(Continued)

(58) Field of Classification Search
None
See application file for complete search history.

(56) References Cited

U.S. PATENT DOCUMENTS

2013/0301547 A1* 11/2013 Gupta ................ H04W 76/048
370/329
2013/0316727 A1  11/2013 Edge
(Continued)

OTHER PUBLICATIONS

Xingqin Lin et al., "An Overview on 3GPP Device-to-Device Proximity Services," Cornell University Library, Oct. 1, 2013, see p. 10, line 21-p. 14, line 2.
(Continued)

*Primary Examiner* — Diane Mizrahi
(74) *Attorney, Agent, or Firm* — Dentons US LLP

(57) ABSTRACT

Provided in one disclosure of the present specification is a method for transmitting a detection signal from user equipment (UE). The method comprises the steps of: driving a mobility management (MM) delay time timer, when the MM delay time timer is received by the UE from a mobility management entity (MME) in a network; confirming the priority for detecting at least one other UE, when detection of the at least one other UE is required before the MM delay time timer expires; and randomly selecting a resource based on a shared resource pool included in system information, which is broadcasted from a base station, and then transmitting to the at least one other UE a detection signal including a proximity service code from the randomly selected resource, when the detection of the at least one other UE is considered to have high priority or to be urgent.

8 Claims, 14 Drawing Sheets

(51) Int. Cl.
*H04W 74/00* (2009.01)
*H04W 4/02* (2009.01)
*H04W 74/08* (2009.01)
*H04W 76/06* (2009.01)

(52) U.S. Cl.
CPC ..... *H04W 74/0833* (2013.01); *H04W 76/068* (2013.01)

(56) References Cited

U.S. PATENT DOCUMENTS

| | | |
|---|---|---|
| 2013/0322276 A1 | 12/2013 | Pelletier et al. |
| 2014/0003373 A1 | 1/2014 | Hakola et al. |
| 2015/0085658 A1* | 3/2015 | Hong ................ H04W 28/0289 370/235 |

OTHER PUBLICATIONS

"3GPP; TSG-RAN; Study on LTE Device to Device Proximity Services-Radio Aspects (Release 12)," 3GPP TR 36.843 V0.2.0, Oct. 8, 2013, see p. 8, line 38-p. 9, line 15.

\* cited by examiner

DETECTION SIGNAL TRANSMISSION METHOD AND USER EQUIPMENT FOR PROXIMITY COMMUNICATION

This application is a 35 USC §371 National Stage entry of International Application No. PCT/KR2015/000054 filed Jan. 5, 2015, and claims priority to U.S. Provisional Application Nos. 61/923,641 filed Jan. 4, 2014 and 62/019,386 filed Jun. 30, 2014, all of which are hereby incorporated by reference in their entireties as if fully set forth herein.

BACKGROUND OF THE INVENTION

Field of the Invention

The present invention relates to proximity communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, high speed data traffic has recently been increased very rapidly. Techniques for offloading traffic of the UE to WLAN (Wi-Fi) have been introduced to cope with such a traffic increase.

The P-GW 53 and the HSS 54 are connected to an access authentication authorization (AAA) server 56. The P-GW 53 and the AAA server 56 may be connected to an evolved packet data gateway (e-PDG) 57. The e-PDG 57 plays a role of a security node for a non-3GPP network (e.g., WLAN or Wi-Fi or the like). The ePDG 57 may be connected to a WLAN access gateway (WAG) 58. The WAG 58 may play a role of the P-GW in a Wi-Fi system.

As can be seen from FIG. 1, a terminal (or UE) having an IP capability may have access to an IP service network (e.g., IMS) provided by a provider (i.e., operator) via various elements in an EPC based on not only a 3GPP access but also a non-3GPP access.

In addition, various reference points (e.g., S1-U, S1-MME, etc.) are shown in FIG. 1. In a 3GPP system, a conceptual link for connecting two functions existing in different function entities of the E-UTRAN and the EPC is defined as a reference point. The reference point of FIG. 1 is summarized in Table 1 below. In addition to the examples of Table 1, various reference points may exist according to a network structure.

TABLE 1

| Reference Point | Description |
|---|---|
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/ negative-acknowledgement (NACK) signals for an uplink (UL) Hybrid Automatic Repeat reQuest (HARQ). ACK/ NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are presented in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 transmits a randomly selected random access preamble to the eNodeB 20. Here, the UE 10 selects one of the 64 candidate random access preambles. Furthermore, the UE selects a subframe corresponding to the PRACH configuration index. The UE 10 transmits the selected random access preamble in the selected subframe.

The eNodeB 20 that has received the random access preamble transmits a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6a shows an example of typical communication.

Referring to FIG. 6a, a UE#1 10-1 exists within a coverage of an eNodeB#1 20-1, and a UE#2 10-2 exists within a coverage of an eNodeB#2 20-2. Communication between the UE#1 10-1 and the UE#2 10-2 may be performed via a core network, for example, an S-GW 52/P-GW 53. As such, a communication path which passes through the core network may be called an infrastructure data path. In addition, communication performed via the infrastructure data path is called infrastructure communication.

FIG. 6b shows the concept of proximity communication expected to be employed in a next-generation communication system.

An increase in a user requirement for a social network service (SNS) results in the arising of a demand for a discovery between physically adjacent UEs and special applications/services, i.e., proximity-based application/services. Therefore, there is a growing increase in a demand for proximity communication between UEs.

In order to apply the aforementioned requirement, as illustrated in FIG. 6b, there is an ongoing discussion on a method capable of performing a directly communication among a UE#1 10-1, a UE#2 10-2, and a UE#3 10-3 or among a UE#4 10-4, a UE#5 10-5, and a UE#6 10-6 without an intervention of an eNodeB 20. Of course, communication may be achieved directly between the UE#1 10-1 and the UE#4 10-4 with the assistance of the eNodeB 20. Meanwhile, the UE#1 10-1 may play a role of a relay for the UE#2 10-2 and the UE#3 10-3 located far from a cell center. Likewise, the UE#4 10-4 may play a role of a relay for the UE#5 10-5 and the UE#6 10-6 located far from the cell center.

Meanwhile, the UE#1 10-1 may transmit a discovery signal to discover other UEs, for example, the UE#5 10-5 and the UE#6 10-6. Alternatively, in order to be discovered by other UEs, for example, the UE#5 10-5 and the UE#6 10-6), the UE#1 10-1 may transmit the discovery signal. However, since the discovery signal can be transmitted arbitrarily irrespective of whether the UE#1 10-1 is located within a specific region of interest, it causes inconvenience to a user of other UEs.

SUMMARY OF THE INVENTION

Accordingly, an object of one disclosure of the present specification is to provide a method capable of solving the aforementioned problem.

In order to achieve the aforementioned object, one disclosure of the present specification provides a method of transmitting a discovery signal. The method may be performed by aa user equipment (UE) and may include: starting a mobility management (MM) back-off timer by the UE, when the MM back-off timer is received from a mobility management entity (MME) in a network; checking a priority for detecting at least one different UE, when discovery of the at least one different UE is required before the MM back-off timer expires; randomly selecting a resource based on a common resource pool included in system information, which is broadcast from a base station, and thereafter transmitting to the at least one different UE a discovery signal including a proximity service code on the randomly selected resource, when the discovery of the at least one different UE has a high priority or is urgent; and waiting until the MM back-off timer expires, and thereafter transmitting to the at least one different UE the discovery signal including the proximity service code on a resource allocated from the base station, when the discovery of the at least one different UE does not have the high priority or is not urgent.

The transmitting to the at least one different UE the discovery signal including the proximity service code on the randomly selected resource may include: determining whether a validity timer of the proximity service code expires, when the discovery of the at least one different UE has a high priority or is urgent; determining whether the UE is located in a valid area of the proximity service code, when the validity timer does not expire; randomly selecting the resource on the basis of the common resource pool included in the system information to be broadcast from the base station; and transmitting to the at least one different UE the discovery signal including the proximity service code on the randomly selected resource.

The method may further include: transmitting a discovery request message to a proximity service server; and receiving a response message for the discovery request message. The response message may include information regarding the proximity service code, the validity timer, and the valid area.

The MM back-off timer may be expressed by T3346 as a back-off timer.

In order to achieve the aforementioned object, one disclosure of the present specification provides a UE for transmitting a discovery signal. The UE may include: a transceiver; and a controller for controlling the transceiver. The controller may be configured for: starting an MM back-off timer, when the MM back-off timer is received from an MME in a network; checking a priority for detecting at least one different UE, when discovery of the at least one different UE is required before the MM back-off timer expires; randomly selecting a resource based on a common resource pool included in system information, which is broadcast from a base station, and thereafter transmitting to the at least one different UE a discovery signal including a proximity service code on the randomly selected resource, when the discovery of the at least one different UE has a high priority or is urgent; and waiting until the MM back-off timer expires, and thereafter transmitting to the at least one different UE the discovery signal including the proximity service code on a resource allocated from the base station, when the discovery of the at least one different UE does not have the high priority or is not urgent.

According to a disclosure of the present specification, the problems of the conventional technique are solved.

DESCRIPTION OF EXEMPLARY EMBODIMENTS

Figure 1:
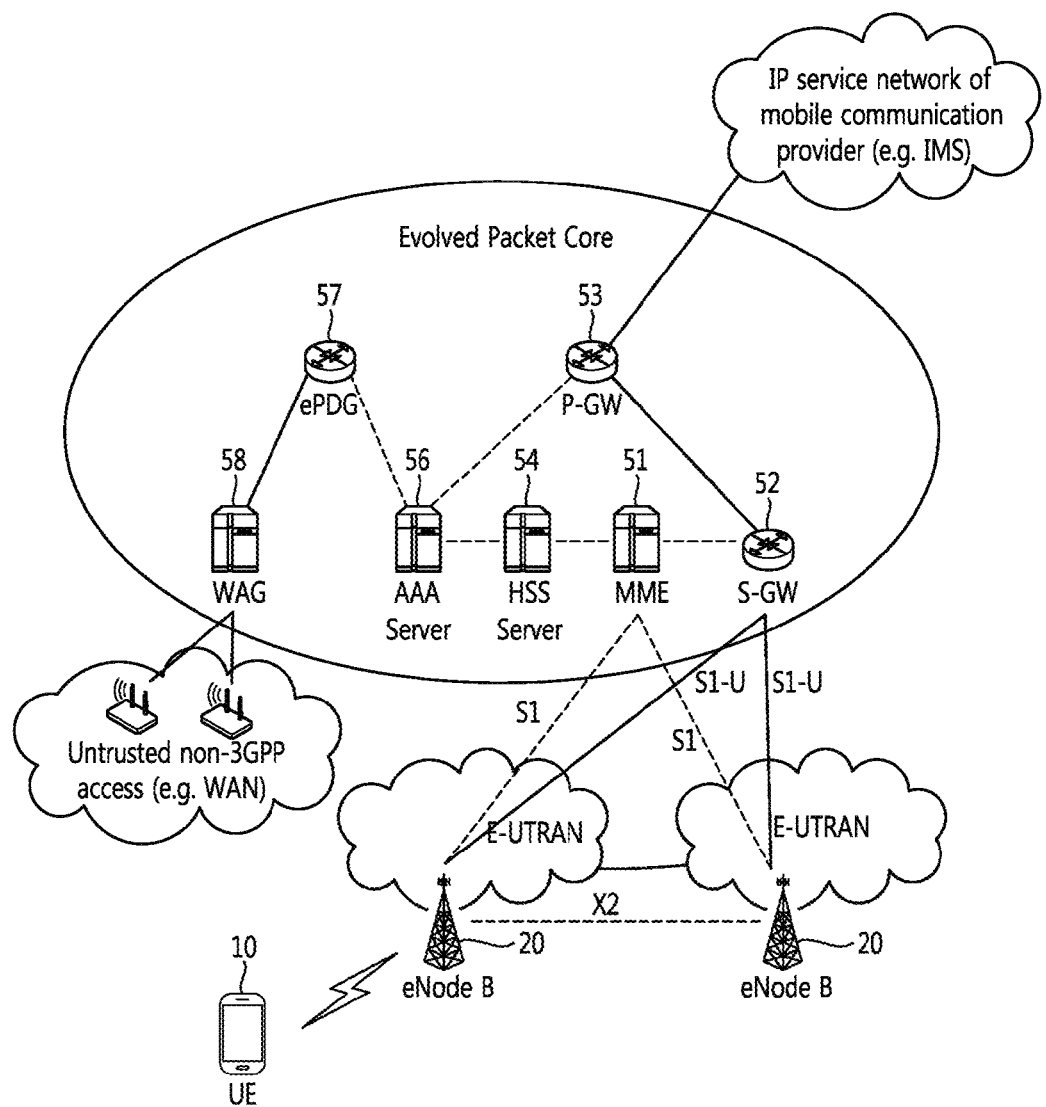
FIG. 1 shows the configuration of an evolved mobile communication network.
Figure 2:
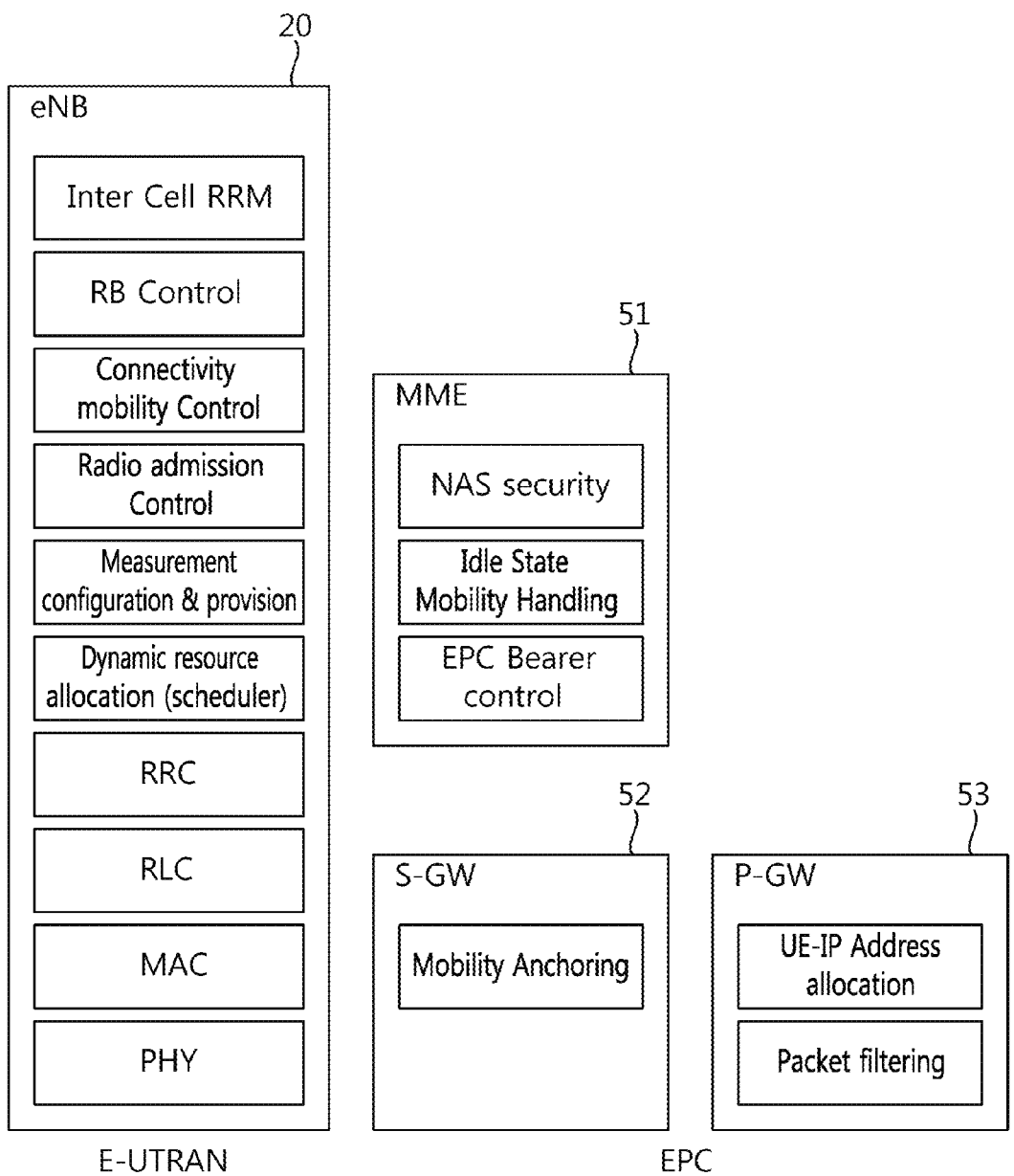
FIG. 2 is an exemplary diagram showing the architecture of a common E-UTRAN and a common EPC.
Figure 3:
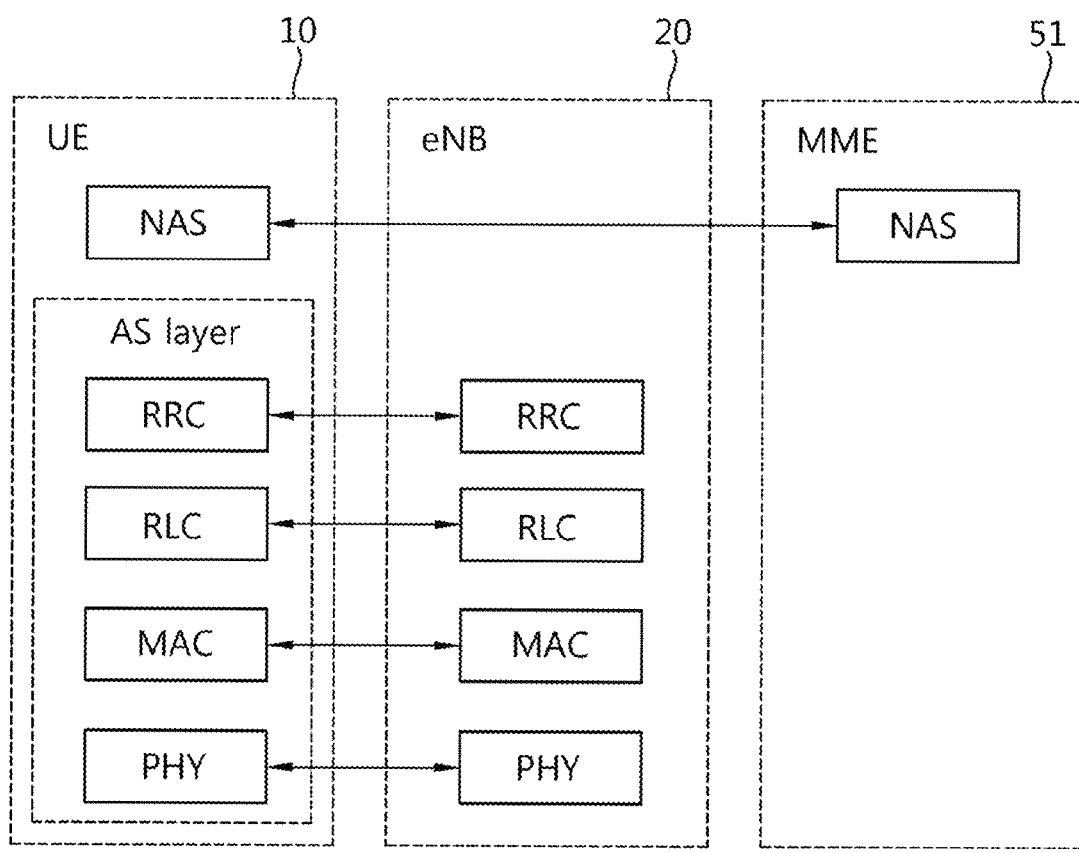
FIG. 3 is an exemplary diagram showing the structure of a radio interface protocol in a control plane between a UE and an eNodeB.
Figure 4:
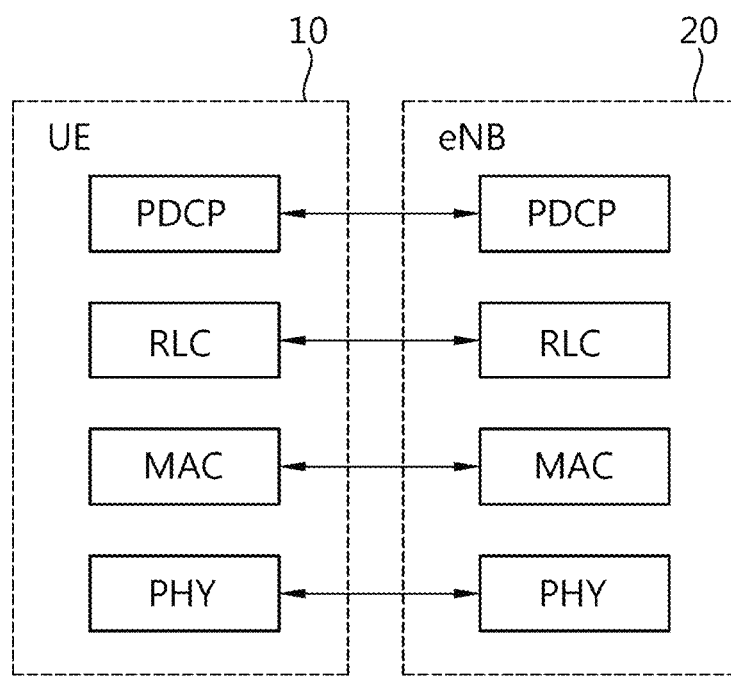
FIG. 4 is another exemplary diagram showing the structure of a radio interface protocol in a control plane between a UE and an eNodeB.
Figure 5:
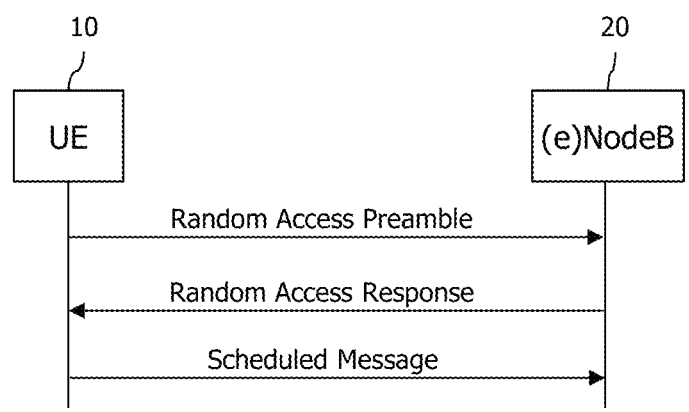
FIG. 5 is a flowchart illustrating a random access process in 3GPP LTE.
Figure 6A:
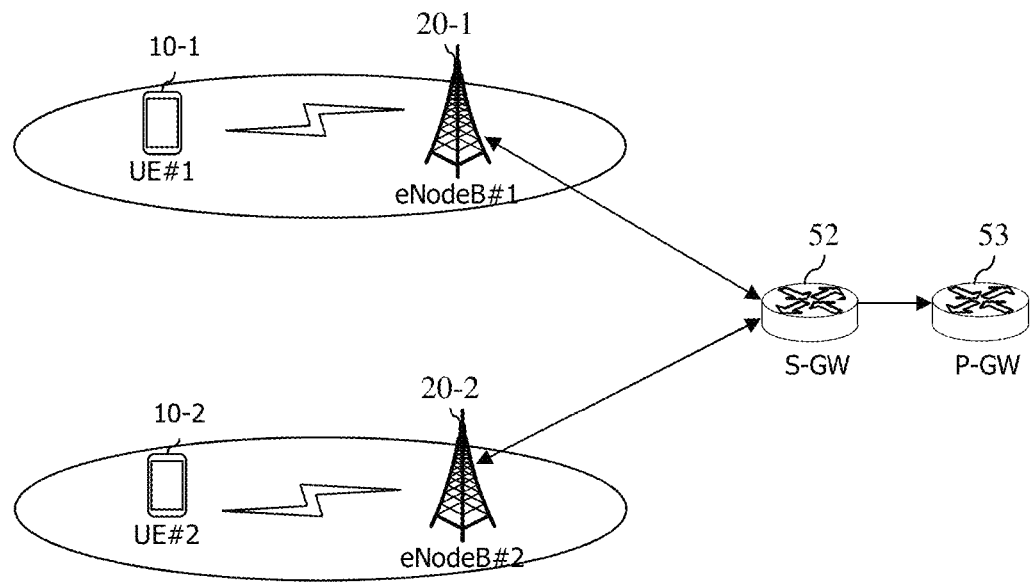
FIG. 6a shows an example of typical communication.
Figure 6B:
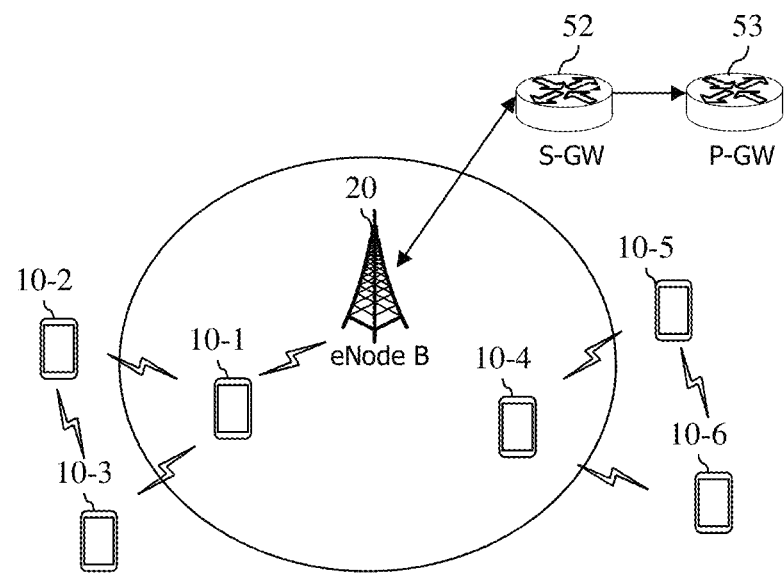
FIG. 6b shows the concept of proximity communication expected to be employed in a next-generation communication system.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

NAS (Non-Access-Stratum): upper stratum of a control plane between a UE and an MME. Supports mobility management, session management, IP address management, etc. between a UE and a network.

RAT: an abbreviation of Radio Access Technology. Means GERAN, UTRAN, E-UTRAN, etc.

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Group Communication: means performing one-to-all group communication using a common communication path established between two or more ProSe-enabled UEs when they are located adjacent to each other.

ProSe E-UTRA communication: means ProSe communication using an E-UTRA communication path.

ProSe-assisted WLAN direct communication: means ProSe communication using a WLAN direct communication path.

ProSe communication path: means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC path (or infrastructure data path): mans a communication path of a user plane via EPC.

ProSe relay: may have two types as a UE capable of operating as a relay for ProSe.

ProSe UE-to-Network Relay: means playing a role of a communication repeater between a ProSe-enabled Network and a ProSe-enabled UE.

ProSe UE-to-UE Relay: means playing a role of a communication repeater between ProSe-enabled UEs.

Meanwhile, the embodiments of the present invention are described with reference to the drawings below.

Figure 7A:
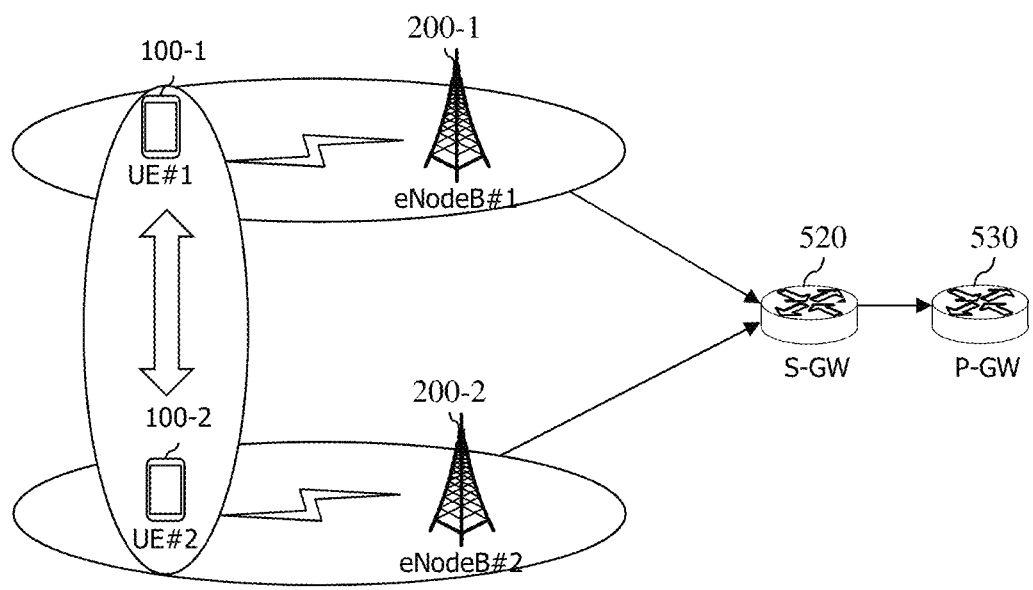
FIG. 7a is an exemplary diagram showing an example of proximity communication.
Figure 7B:
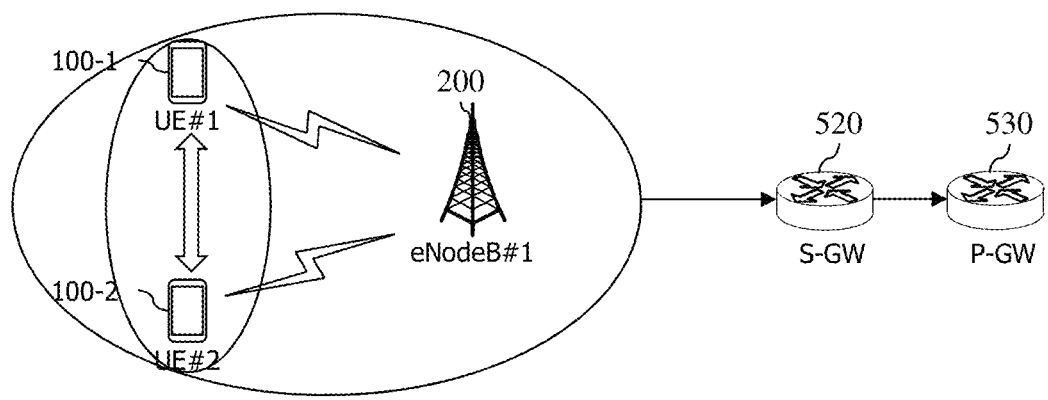
FIG. 7b is an exemplary diagram showing another example of proximity communication.

FIG. 7a is an exemplary diagram showing an example of proximity communication, and FIG. 7b is an exemplary diagram showing another example of proximity communication.

Referring to FIG. 7a, there is illustrated a situation that a UE#1 100-1 and a UE#2 100-2 perform proximity communication through a direct communication path while camping on different eNodeBs, respectively. Referring to FIG. 7b, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Meanwhile, as an example of a proximity service, there may be a safety-related service. For example, although a user of a UE is in an emergency situation, if the user is located outside the coverage of an eNodeB, the user may deliver a rescue signal to other UEs through the proximity service to notify that the user is in the emergency situation. Alternatively, if the user of the UE is dispatched for an emergency rescue but is located outside the coverage of the eNodeB, the user may deliver the rescue signal to other UEs through the proximity service to notify the emergency situation to other emergency rescuers or to request for a rescue.

A social network service (SNS) may be one example of another proximity service. The SNS causes data transmission very often, which may result in an increase in a load of the eNodeB. Therefore, the proximity service is directly performed between UEs without an intervention of the eNodeB, thereby decreasing the load of the eNodeB.

A group communication service may be utilized as one example of another proximity service. Alternatively, a service such as Push-To-Talk (PTT) may be taken as one example of the group communication service. Taking the PTT service for example, one UE may transmit media (e.g., voice or the like) as a talking partner, and a plurality of other UEs may receive the media of the talking party UE. In this case, several UEs cannot transmit the media simultaneously as the talking partner.

Figure 8A:
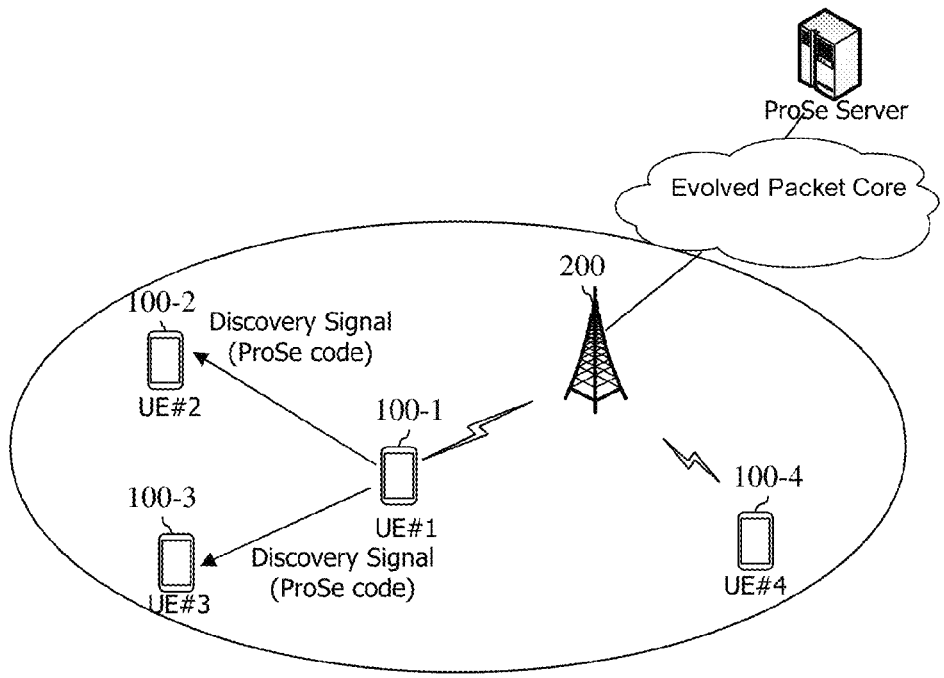
FIG. 8a shows an example of transmitting a discovery signal for a proximity service.
Figure 8B:
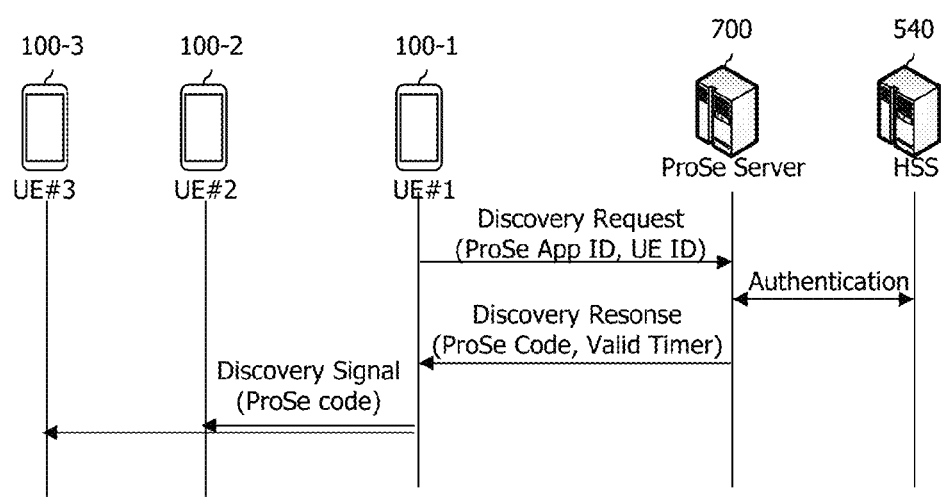
FIG. 8b shows a procedure of acquiring a proximity service code (e.g., ProSe code) for the discovery signal.

FIG. 8a shows an example of transmitting a discovery signal for a proximity service, and FIG. 8b shows a procedure of acquiring a proximity service code (e.g., ProSe code) for the discovery signal.

A UE#1 100-1 of FIG. 8a may perform a direct discovery procedure for the proximity service. The direct discovery procedure is a procedure for confirming whether the UE#1 100-1 is located in proximity to a UE#2 100-1 and a UE#3 100-3. Alternatively, it is a procedure in which the UE#1 100-1 reports to the UE#2 100-1 and the UE#3 100-3 that the UE#1 100-1 is located in proximity.

During the direct discovery procedure, the UE#1 100-1 may transmit the discovery signal for reporting its existence to the UE#2 100-2 and the UE#3 100-3. The discovery signal may include a proximity service code, for example, a ProSe code.

The proximity service code (e.g., ProSe code) is created on the basis of the following information in a bit-stream form.

i) a PLMN specific part, e.g., a mobile country code (MCC) and a mobile network code (MNC)

ii) an ID of a ProSe server which has allocated the proximity service code (e.g., ProSe code)

iii) a temporary UE identifier that is unique within the ProSe server which has allocated the proximity service code (e.g., ProSe code).

iv) an ID of an application which has requested for a direct discovery

A validity timer may be determined in the proximity service code (e.g., ProSe code). Therefore, only for the duration of the validity timer, the UE#1 100-1 can use the proximity service code (e.g., ProSe code), and cannot use it any more when the validity timer expires. By using the validity timer in this manner, an operator who provides a proximity service may make a charge for this. For example, the proximity service may be charged on a monthly basis, and the proximity code (e.g., ProSe code) in which the validity timer is set to one month may be allocated to the UE#1 100-1.

Meanwhile, as can be seen from FIG. 8b, a UE#1 100-1 may transmit a discovery request message to a ProSe server 700 before performing the proximity discovery procedure. The discovery request message may include an ID of the UE#1 100-1, that is, a UE ID, and an ID of a ProSe application.

The ProSe server 700 acquires and authenticates information of the UE#1 100-1 from an HSS 540, and thereafter creates the proximity service code (e.g., ProSe code). Subsequently, the ProSe server 700 transmits a discovery response message including the proximity service code (e.g., ProSe code) and a value of the validity timer to the UE#1 100-1.

Then, the UE#1 100-1 transmits the discover signal including the proximity service code (e.g., ProSe code) to the UE#2 100-2 and the UE#3 100-3.

Figure 9:
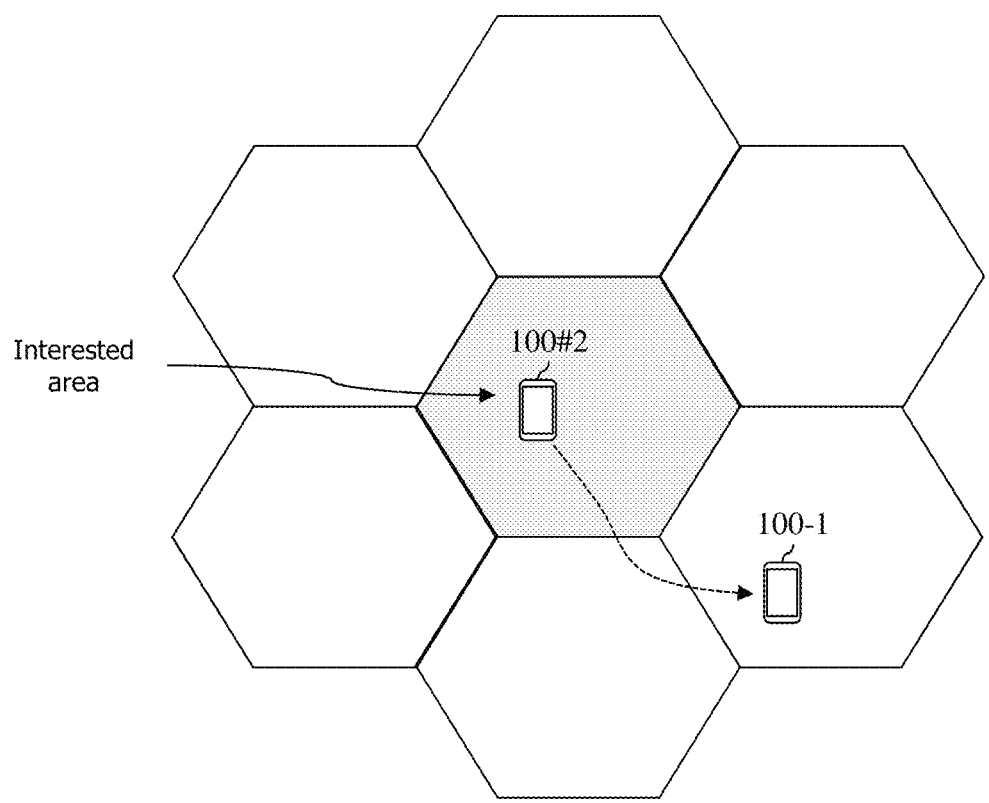
FIG. 9 shows an example of one problem when performing a proximity service based on a geographical location.

FIG. 9 shows an example of one problem when performing a proximity service based on a geographical location.

Referring to FIG. 9, a UE#1 100-1 may perform a proximity service which is meaningful only in a specific region of interest.

For example, the UE#1 100-1 may provide the proximity service so that a restaurant or a shop or the like offers a promotion/advertisement to neighboring UEs. In this case, a proximity service code (e.g., ProSe code) transmitted by the UE#1 100-1 may be valid only when the UE#1 100-1 exists in the restaurant or the shop.

For another example, the UE#1 100-1 may require a proximity service for communication between co-workers in the office. Likewise, in this case, the proximity service code (e.g., ProSe code) transmitted by the UE#1 100-1 may be valid only when the UE#1 100-1 is located in the office.

However, as shown in FIG. 9, if the UE#1 100 moves out of the specific region of interest to another region, the proximity service code (e.g., ProSe code) may be meaningless.

However, the ProSe server 700 allocates the proximity service code (e.g., ProSe code) to the UE#1 100-1 without any restriction, so that the discovery signal including the proximity service code (e.g., ProSe code) can be arbitrarily transmitted irrespective of whether the UE#1 100-1 is in the specific region of interest, which causes inconvenience to a user of other UEs.

Figure 10A:
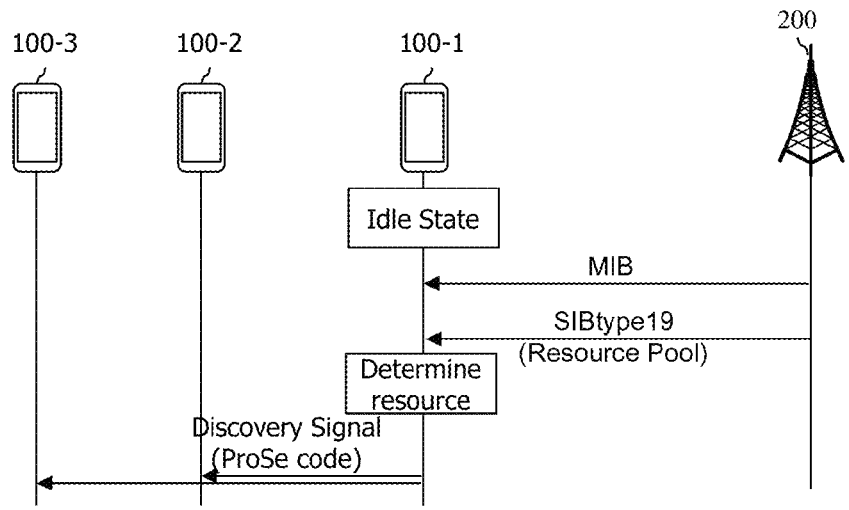
FIG. 10a and FIG. 10b show a procedure of determining a resource for transmitting a proximity service code (e.g., ProSe code).
Figure 10B:
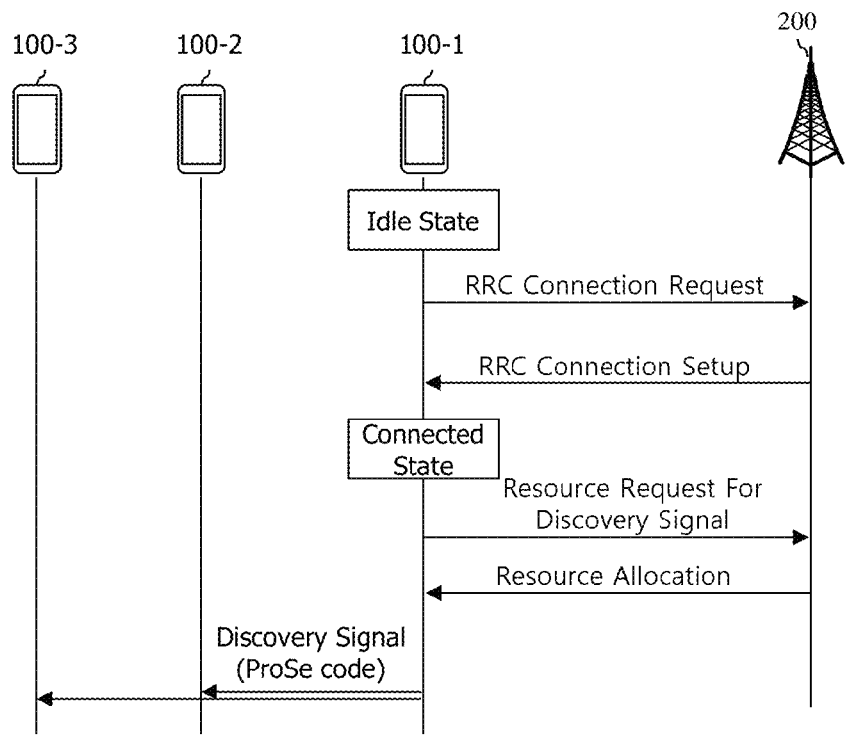

FIG. 10a and FIG. 10b show a procedure of determining a resource for transmitting a proximity service code (e.g., ProSe code).

The UE#1 100-1 must be allocated a radio resource for broadcasting a discovery signal including the proximity service code (e.g., ProSe code).

There are roughly two methods for allocating the radio resource. A first method is a selection method performed by a UE in a common resource pool, and a second method is a scheduling-based radio resource allocation method.

i) Selection Method Performed by a UE in a Common Resource Pool

As can be seen from FIG. 10a, an eNodeB 200 broadcasts system information by dividing it into, for example, a master information block (MIB) and several system information blocks (SIBs). In this transmission, information regarding a common resource pool for a direct discovery is included in an SIB type 19 among the SIBs.

The UE#1 100-1 acquires the information regarding the common resource pool in the SIB type 9 in an idle state, and if there is a need to transmit a proximity service code (e.g., ProSe code), randomly selects a resource in the common resource pool.

In addition, the UE#1 100-1 transmits a discovery signal including the proximity service code (e.g., ProSe code) on the selected resource.

The common resource pool may include, for example, a resource for an emergency service and a contention-based resource. As to the contention-based resource, it may not be guaranteed that resources randomly selected by several UEs are prevented from collision. Therefore, if the resources randomly selected by the several UEs are identical to each other, the discovery signal for each UE may collide on the same resource.

ii) Scheduling-Based Radio Resource Allocation Method

As shown in FIG. 10b, if there is a need to transmit a discovery signal including a proximity service code (e.g., ProSe code), the UE#1 100-1 in an idle state performs an RRC connection procedure to transition to a connected state. The RRC connection procedure includes transmission of an RRC connection request (e.g., RRC CONNECTION REQUEST) message and reception of an RRC connection setup message.

When in the RRC connected state, the UE#1 100-1 transmits a resource request message for the discovery signal. When a resource is allocated from the eNodeB 200, the discovery signal including the proximity service code (e.g., ProSe code) is transmitted on the allocated resource.

Since collision avoidance may not be guaranteed in the aforementioned selection method performed by the UE in the common resource pool, a radio resource is allocated to the UE in general through the scheduling-based radio resource allocation method.

However, the UE#1 100-1 may be out of the specific region of interest and thus a resource may be allocated thereto from an eNodeB of a different region, thereby being capable of arbitrarily transmitting the proximity service code (e.g., ProSe code) even in the different region, which causes resource waste. In addition, there is a problem in that unnecessary signaling is caused when the UE#1 100-1 is out of the specific region of interest and performs the RRC connection procedure so that the resource is allocated in the different region.

Figure 11A:
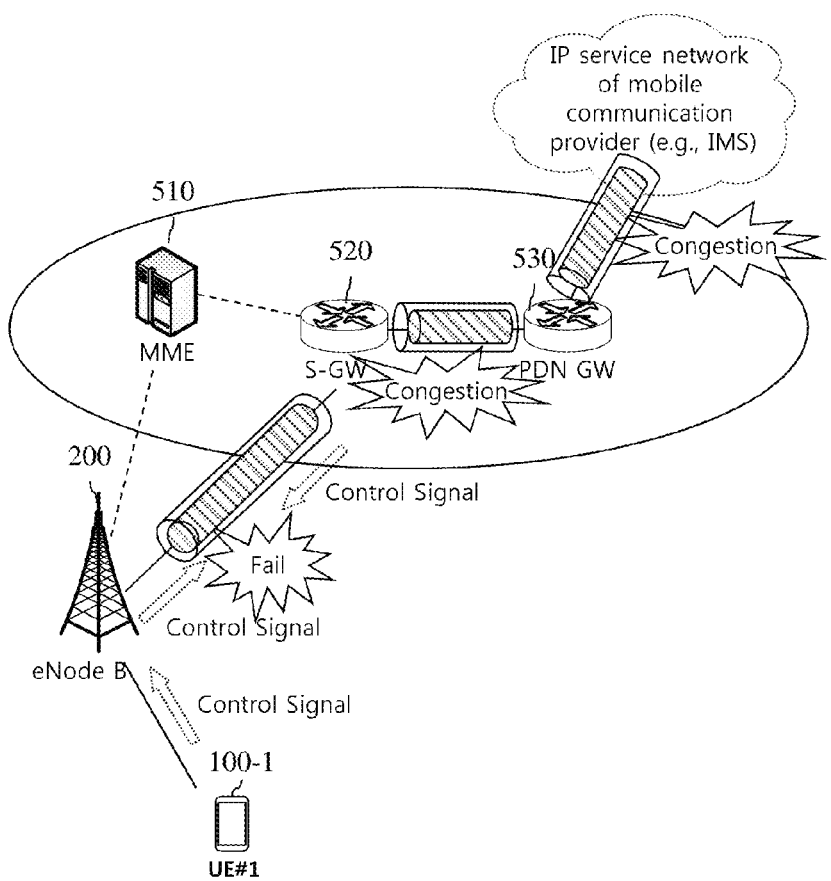
FIG. 11a shows a network congestion situation.
Figure 11B:
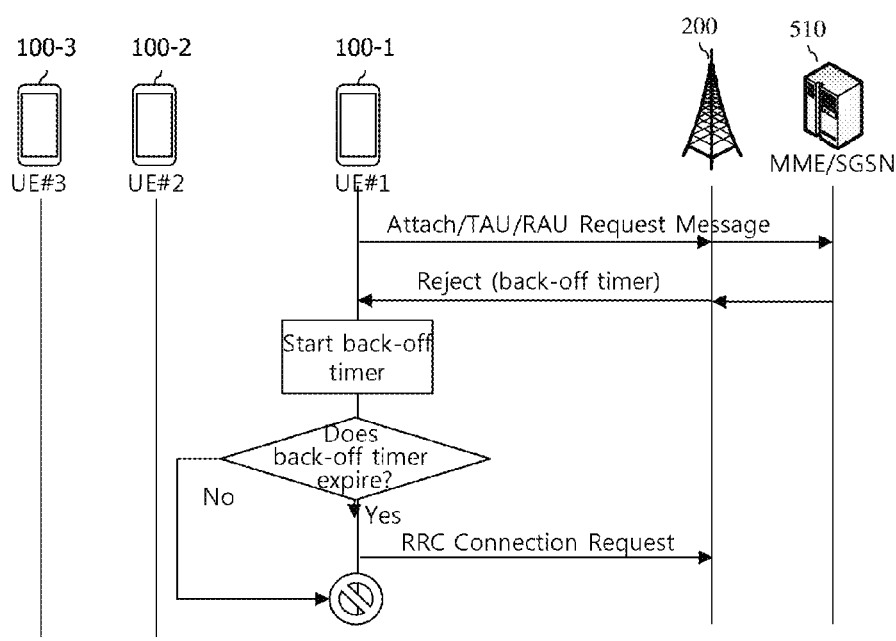
FIG. 11b shows an example in which a radio resource for transmitting a discovery signal cannot be allocated since a wait timer is driven in the network congestion situation.

FIG. 11a shows a network congestion situation, and FIG. 11b shows an example in which a radio resource for transmitting a discovery signal cannot be allocated since a wait timer is driven in the network congestion situation.

As shown in FIG. 11a, if traffic is overloaded or congested in an interface between the eNodeB 200 and the S-GW 520, a downlink control signal to the UE#100-1 or an uplink control signal from the UE#1 100-1 is not correctly transmitted, which results in a transmission failure.

Alternatively, even if the overload or congestion occurs in the interface between the S-GW 520 and the PDN-GW 530 or an interface between the PDN-GW 530 and an Internet protocol (IP) service network of a mobile communication provider, the downlink control signal to the UE#1 100-1 or the uplink control signal from the UE#1 100-1 is not correctly transmitted, which results in a transmission failure.

The uplink control signal from the UE#1 100-1 may be, for example, an attach request message, a tracking area update (TAU) request message, and a routing area update (RAU) request message.

As can be seen from FIG. 11b, when the UE#1 100-1 transmits the attach request message, the TAU request message, the RAU request message, or the service request message to the MME/SGSN 510 via the eNodeB 200 at the occurrence of the network congestion or overload, the MME/SGSN 510 transmits a reject message for the attach request message, the TAU request message, the RAU request message, or the service request message according to a network situation such as an operator policy or the like.

In addition, the MME/SGSN 510 may transmit the reject message by including a back-off timer (e.g., an MM back-off timer) into the reject message, and thus the UE#1 100-1 is not allowed to retry an access until the duration thereof expires.

If the reject message is the TAU reject message, information to be included is as shown in Table 2 below.

TABLE 2

| Information | Description |
| --- | --- |
| Protocol discriminator | Discriminator for discriminating protocols |
| Security header type | Type of headers used for security |
| TAU reject message ID | Message identifier |
| EMM cause | Indication of reject cause |
| T3346 value | Back-off timer (e.g., MM back-off timer) |

As such, if the UE#1 100-1 performs reception by driving, for example, the MM back-off timer due to a network congestion situation, transmission to a connected mode cannot be achieved for resource allocation in order to transmit a discovery signal until the MM back-off timer expires. That is, a connection setup procedure and a service request procedure cannot be initiated in order to transition to the connected mode.

However, if a ProSe application in the UE#1 100-1 delivers a high-priority (or urgent) discovery request to an NAS layer and an AS layer, the NAS layer and the AS layer cannot initiate the connection setup procedure and the service request procedure until the MM back-off timer expires. The high-priority (or urgent) discovery request may be a case where a UE for transmitting a typical information discovery signal usually for example in a subway station (for example, information on a first/last train information, information on an estimated arrival time of a next train, or the like) is informed or detects that a pickpocket occurs in the subway station and thus intends to transmit a discovery signal for warning this.

Meanwhile, even if the UE#1 100-1 transmits the RRC connection request message in the network congestion situation, the eNodeB 200 may transmit an extended wait timer to the UE#1 100-1 together with an RRC connection request reject message. In this case, the UE#1 100-1 sets up and drives the extended wait timer received from the eNodeB 200 as the MM back-off timer, and thus cannot initiate the connection setup procedure and the service request procedure until the MM back-off timer expires.

Although the ProSe application in the high-priority (or urgent) UE#1 100-1 is requested as described above, if the UE#1 100-1 drives the MM back-off timer due to the network congestion situation, a resource for transmitting a discovery signal cannot be allocated. Therefore, a solution for this is necessary.

Accordingly, disclosures of the present specification propose methods for solving the aforementioned problem.

<Brief Descriptions for Disclosures of the Present Specification>

In order to solve the aforementioned problems, the disclosures of the present specification propose a mechanism for effectively providing a proximity-based service in a mobile communication system such as a 3GPP evolved packet system (EPS).

A first disclosure of the present specification proposes a method of allocating a proximity service code (e.g., ProSe code) for a discovery signal to a UE. In addition, a second disclosure of the present specification proposes a method of transmitting a discovery signal when an MM back-off timer is driven due to a network congestion. Hereinafter, the first and second disclosures of the present specification are described in brief.

I. First Disclosure of the Present Specification

When a UE#1 100-1 transmits a discovery request message to a ProSe server 700, an ID of an application requesting for discovery in the discovery request message and service/business information requiring the discovery are included. Then, the ProSe server 700 allocates a proximity service code (e.g., ProSe code) to the UE#1 100-1 on the basis of the information. In this case, the ProSe server 700 determines an area/location in which the allocated proximity service code (e.g., ProSe code) is valid. In addition, a response message for the discovery request message is transmitted by including the allocated proximity service code (e.g., ProSe code) and information regarding the valid area/location into the allocated proximity service code (e.g., ProSe code). The valid area/location information may be one or more pieces of information described below.

i) a cell list including one or more cells (i.e., a list of ECGIs (E-UTRAN Cell Global Identifiers))

In this case, it is regarded that the proximity service code (e.g., ProSe code) is valid only when the UE#1 100-1 camps on a cell included in the cell list.

ii) a tracking area identify (TAI) list including one or more tracking areas

In this case, it is regarded that the proximity service code (e.g., ProSe code) is valid only when the UE#1 100-1 is located in a tracking area included in the TAI list.

iii) a list including an ID of an eNodeB including one or more eNodeBs, that is, an eNodeB ID (or global eNodeB ID)

In this case, it is regarded that the proximity service code (e.g., ProSe code) is valid only when the UE#1 100-1 camps on an eNodeB included in the eNodeB ID list.

iv) an MME list including one or more MMEs

In this case, it is regarded that the proximity service code (e.g., ProSe code) is valid only when the UE#1 100-1 is served by an MME included in the MME list.

v) Coordinate information or geographic location information

In this case, it is regarded that the proximity service code (e.g., ProSe code) is valid only when the UE#1 100-1 exists in the coordinate or geographic location.

vi) Area or address information

In this case, it is regarded that the proximity service code (e.g., ProSe code) is valid only when the UE#1 100-1 is located in the area or address.

Meanwhile, information used by the ProSe server 700 to allocate/configure the proximity service code (e.g., ProSe code) and the valid area/location information may be information autonomously included in the ProSe server 700, information acquired from the UE#1 100-1, and information acquired from a different network node (e.g., an HSS/HLR, an application server, etc.).

The ProSe server 700 may allocate a new proximity service code (e.g., ProSe code) whenever there is a change in the valid area/location information for an application allowed to be discovered, and thus may provide the UE with the new proximity service code (e.g., ProSe code) together with the changed valid area/location information.

Although it is described up to now that the valid area/location information for the proximity service code (e.g., ProSe code) is provided by the ProSe server 700 to the UE#1 100-1, unlike this, it may be configured in the UE#1 100-1.

Meanwhile, although it is described up to now that the proximity service code (e.g., ProSe code) is allocated by the ProSe server 700, unlike this, it may be allocated by a different network node (e.g., a network node for managing mobility such as an MME or an SGSN, a network node for maintaining subscriber information such as an HSS, a server for providing group communication such as a GCSE AS (Group Communication Service Enabler Application Server), an AAA (Authentication Authorization Accounting) server or SSS proxy for being involved in authentication or the like, an ANDSF (Access Network Discovery and Selection Function) entity, a gateway node such as P-GW, or an eNodeB.

On the other hand, after the proximity service code (e.g., ProSe code) is allocated from the ProSe server 700, the UE#1 100-1 confirms whether it is in the valid area/location of the proximity service code (e.g., ProSe code), whenever the proximity service code (e.g., ProSe code) needs to be transmitted.

If it is determined that it is in the valid area/location of the proximity service code (e.g., ProSe code), the UE#1 100-1 confirms whether a radio resource for transmitting the proximity service code (e.g., ProSe code) is present/available.

If the radio resource is present/available, the proximity service code (e.g., ProSe code) is transmitted. Otherwise, if the radio resource is absent/unavailable, a procedure for allocating the radio resource is performed.

If the UE#1 100-1 in the valid area/location is determined to be out of the valid area/location while the proximity service code (e.g., ProSe code) is transmitted, transmission of the proximity service code (e.g., ProSe code) stops/ends. Alternatively, if the radio resource needs to be newly allocated, it may be unnecessary to newly allocate the radio resource if the proximity service code (e.g., ProSe code) becomes invalid due to a location change (e.g., a cell change, an eNodeB change, etc.).

The UE#1 100-1 may confirm whether it is in the valid area/location whenever the proximity service code (e.g., ProSe code) is transmitted, and may confirm whether it is in the valid area/location according to a specific period. The confirmation may be on the basis of a period for each proximity service code (e.g., ProSe code). Alternatively, it may be confirmed on the basis of one period for all proximity service codes (e.g., ProSe code). In addition, it may be confirmed whether it is in the valid area/location of the proximity service code (e.g., ProSe code) whenever the area/location of the UE#1 100-1 is changed.

Information regarding a time/period/event at which the UE#100-1 needs to confirm whether it is in the valid area/location of the proximity service code (e.g., ProSe code) may be provided together when the ProSe server 700 provides the proximity service code (e.g., ProSe code) to the UE#1 100-1 or may be configured in the UE#100-1.

Meanwhile, the UE#1 100-1 may confirm whether it is a validity timer simultaneously while confirming whether it is located in the valid area/location of the proximity service code (e.g., ProSe code).

II. Second Disclosure of the Present Specification

Method of acquiring a resource for transmitting a discovery signal when an MM back-off timer is driven.

When a UE#100-1 drives an MM back-off timer, the following operation is performed if a discovery request is made from a ProSe application included therein.

The UE#1 100-1 confirms whether the discovery request has a high priority and/or is urgent.

If the discovery request has the high priority or is urgent, the UE#1 100-1 selects a radio resource from a resource pool included in an SIB 19. Thereafter, the discovery signal including the proximity service code (e.g., ProSe code) is transmitted in the idle state.

Hereinafter, first and second disclosures of the present specification are described with reference to the accompanying drawings.

Figure 12:
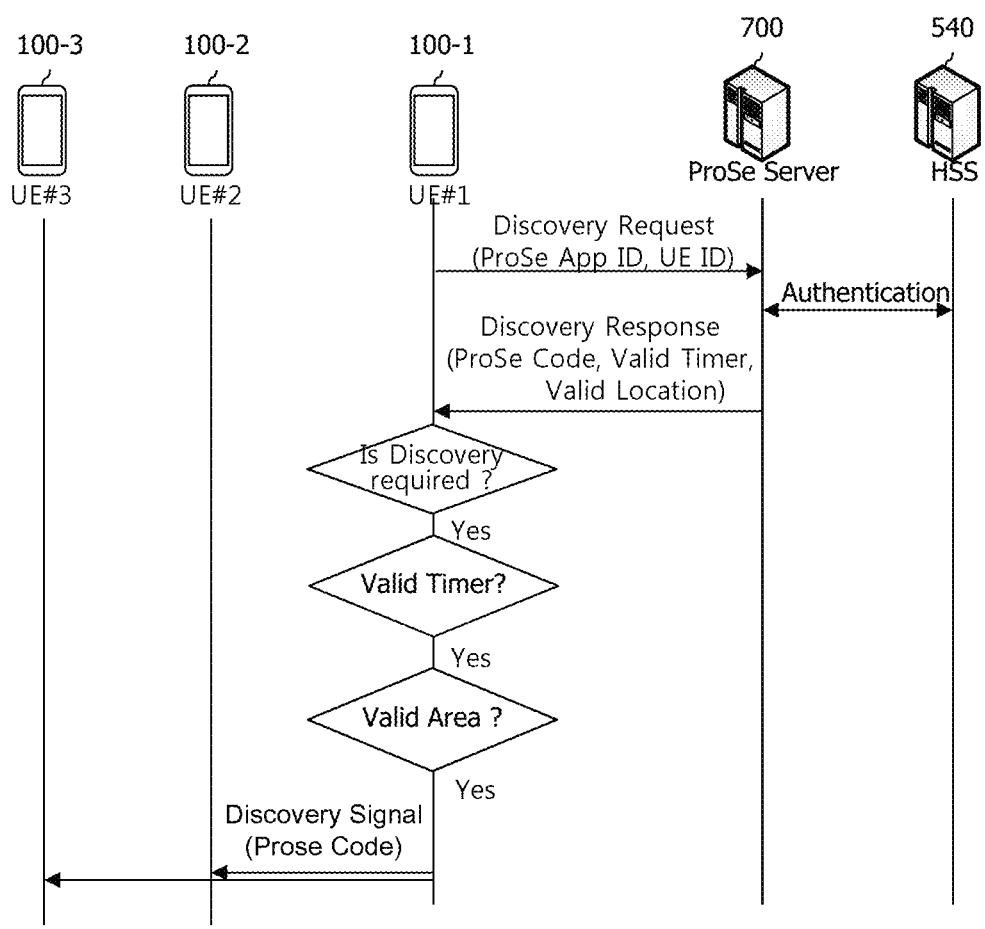
FIG. 12 shows a signal flow of an exemplary method according to a first disclosure of the present specification for solving the problem of FIG. 9.

FIG. 12 shows a signal flow of an exemplary method according to a first disclosure of the present specification for solving the problem of FIG. 9.

A UE#1 100-1 may transmit a discovery request message to a ProSe server 700 before performing the proximity discovery procedure. The discovery request message may include an ID of the UE#1 100-1, that is, a UE ID, and an ID of a ProSe application.

The ProSe server 700 acquires and authenticates information of the UE#1 100-1 from an HSS 540, and thereafter creates the proximity service code (e.g., ProSe code). Subsequently, the ProSe server 700 determines the proximity service code (e.g., ProSe code) and a validity timer. Further, the ProSe server 700 determines a valid area/location of the proximity service code (e.g., ProSe code). Herein, the valid area/location may be interpreted as information of an area/location in which the UE#1 100-1 is allowed to transmit the proximity service code (e.g., ProSe code) or may be interpreted as information of an area/location in which the UE#1 100-1 is authorized to transmit the proximity service code (e.g., ProSe code).

Subsequently, the ProSe server 700 transmits a discovery response message including the proximity service code (e.g., ProSe code), the validity timer, and the valid area/location information to the UE#1 100-1.

Then, if there is a discovery request from an application, the UE#1 100-1 determines whether the validity timer of the proximity service code (e.g., ProSe code) expires. If the validity timer does not expire, the UE#1 100-1 determines whether it is located in a valid area of the proximity service code (e.g., ProSe code).

If the validity timer does not expire and if it is located in the valid area, the discovery signal including the proximity service code (e.g., ProSe code) is transmitted to other UEs, for example, a UE#2 100-2 and a UE#3 100-3.

Figure 13:
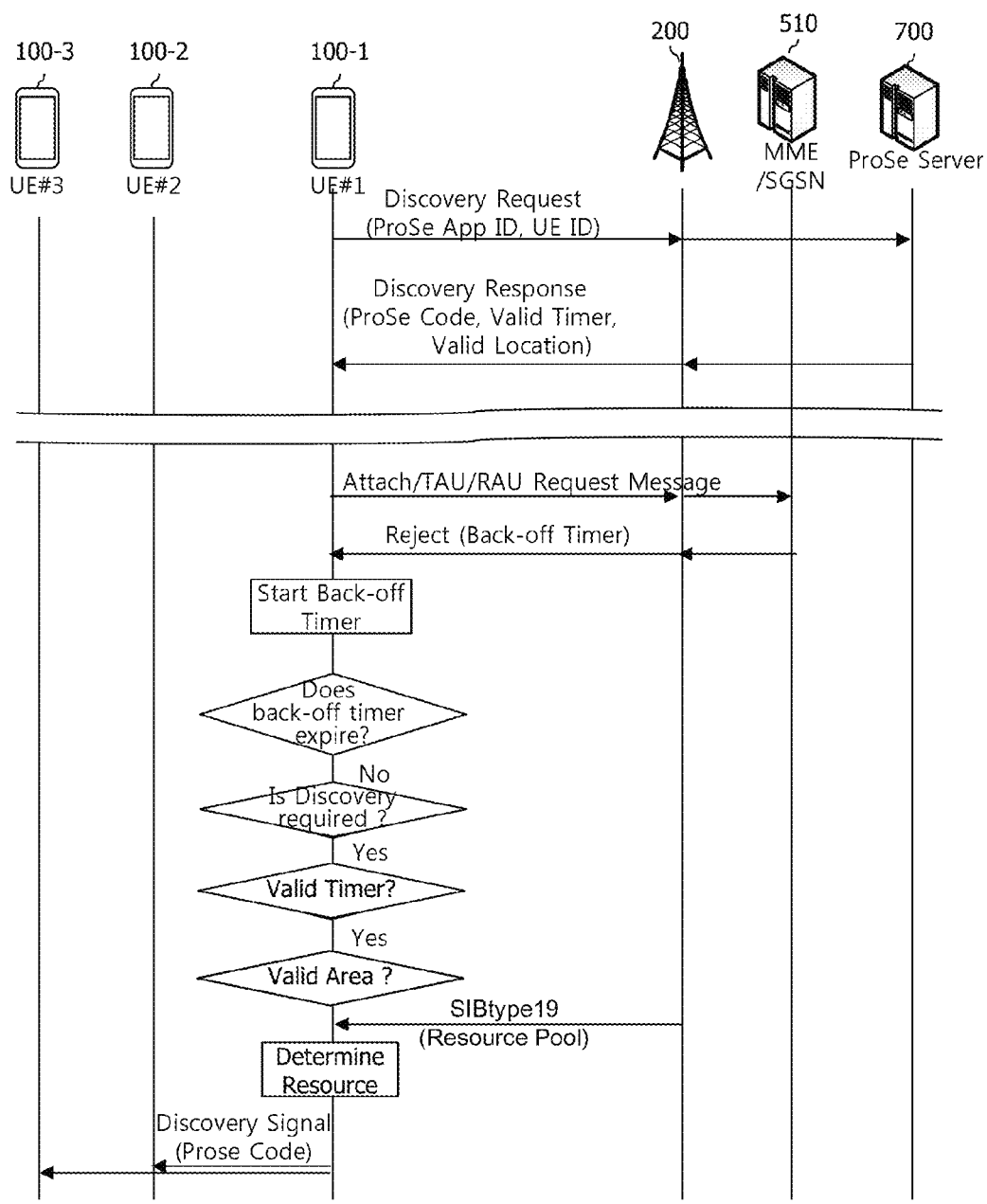
FIG. 13 shows a signal flow of an exemplary method according to a second disclosure of the present specification for solving the problem of FIG. 9 and FIG. 11b.

FIG. 13 shows a signal flow of an exemplary method according to a second disclosure of the present specification for solving the problem of FIG. 9 and FIG. 11*b*.

A UE#1 100-1 may transmit a discovery request message to a ProSe server 700 before performing the proximity discovery procedure. The discovery request message may include an ID of the UE#1 100-1, that is, a UE ID, and an ID of a ProSe application.

The ProSe server 700 determines the proximity service code (e.g., ProSe code), a validity timer, and a valid area/location, and thereafter transmits the discover response message to the UE#1 100-1.

Meanwhile, when the UE#1 100-1 transmits the attach request message, the TAU request message, the RAU request message, or the service request message to an MME/SGSN 510 via an eNodeB 200 at the occurrence of the network congestion or overload, the MME/SGSN 510 transmits a reject message by including a back-off time (e.g., MM back-off timer) into the reject message.

If the UE#1 100-1 receives a discovery request from a ProSe application included therein while driving the MM back-off timer in an idle state, it is determined whether the validity timer of the proximity service code (e.g., ProSe code) expires. If the validity timer does not expire, the UE#1 100-1 determines whether it is located in a valid area of the proximity service code (e.g., ProSe code).

If the validity timer does not expire and if it is located in the valid area, it is confirmed whether the discovery request of the ProSe application has a high priority and/or is urgent.

If the discovery request has the high priority or is urgent, the UE#1 100-1 selects a radio resource from a resource pool included in an SIB 19. Thereafter, the discovery signal including the proximity service code (e.g., ProSe code) is transmitted in the idle state.

However, if the discovery request does not have the high priority or is not urgent, the UE#1 100-1 performs the RRC connection procedure and the service request procedure after waiting until the MM back-off timer expires, and a resource for the discovery signal is allocated from the eNodeB 200 to transmit the discovery signal including the proximity service code (e.g., ProSe code).

The determining of whether the discovery request of the ProSe application has the high priority and/or is urgent may be performed before the determining of whether the validity timer of the proximity service code (e.g., ProSe code) expires.

The discovery request may be a request for discovering one or more different UEs, and may be a discovery request notifying of its existence to other UEs.

The disclosures of the present specification described up to now are not limited to an LTE/EPC network but are also applicable to an overall UMTS/EPS mobile communication system including both of a 3GPP access network (UTRAN/GERAN/E-UTRAN) and a non-3GPP access network (e.g., WLAN, etc.). Further, it is also applicable to all other wireless mobile communication systems in an environment where other network controls are applied.

The content described up to now can be implemented in hardware. This will be described with reference to FIG. 14.

Figure 14:
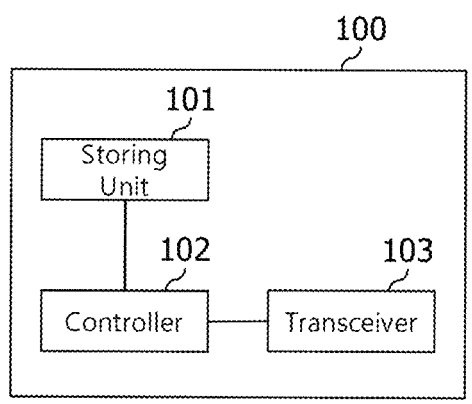
FIG. 14 is a block diagram of a UE 100 according to one disclosure of the present specification.

FIG. 14 is a block diagram of a UE 100 according to one disclosure of the present specification.

As shown in FIG. 14, the UE 100 includes a storage unit 101, a controller 102, and a transceiver 103.

The storage unit 101 stores the aforementioned method.

The controller 102 controls the storage unit 101 and the transceiver 103. More specifically, the controller 102 executes each of the methods stored in the storage unit 101. Further, the controller 102 transmits the aforementioned signals via the transceiver 103.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method of transmitting a discovery signal, the method performed by a user equipment (UE) and comprising:
   starting, by the UE, a mobility management (MM) back-off timer, when the MM back-off timer is received from a mobility management entity (MME) in a network;
   checking a priority for detecting at least one different UE, when a discovery of the at least one different UE is required before the MM back-off timer expires;
   randomly selecting a resource based on a common resource pool included in system information, which is broadcast from a base station, and thereafter transmitting to the at least one different UE a discovery signal including a proximity service code on the randomly selected resource, when the discovery of the at least one different UE has a high priority or is urgent; and
   waiting until the MM back-off timer expires, and thereafter transmitting to the at least one different UE the discovery signal including the proximity service code on a resource allocated from the base station, when the discovery of the at least one different UE does not have the high priority or is not urgent.

2. The method of claim 1, wherein the transmitting to the at least one different UE the discovery signal including the proximity service code on the randomly selected resource comprises:
   determining whether a validity timer of the proximity service code expires, when the discovery of the at least one different UE has a high priority or is urgent;
   determining whether the UE is located in a valid area of the proximity service code, when the validity timer does not expire;
   randomly selecting the resource on the basis of the common resource pool included in the system information to be broadcast from the base station; and
   transmitting to the at least one different UE the discovery signal including the proximity service code on the randomly selected resource.

3. The method of claim 2, further comprising:
   transmitting a discovery request message to a proximity service server; and
   receiving a response message for the discovery request message, wherein the response message includes information regarding the proximity service code, the validity timer, and the valid area.

4. The method of claim 1, wherein the MM back-off timer is expressed by T3346 as a back-off timer.

5. A user equipment (UE) for transmitting a discovery signal, the UE comprising:
   a transceiver; and
   a controller for controlling the transceiver, wherein the controller is configured for:
   starting a mobility management (MM) back-off timer, when the MM back-off timer is received from a mobility management entity (MME) in a network;
   checking a priority for detecting at least one different UE, when discovery of the at least one different UE is required before the MM back-off timer expires;
   randomly selecting a resource based on a common resource pool included in system information, which is broadcast from a base station, and thereafter transmitting to the at least one different UE a discovery signal including a proximity service code on the randomly selected resource, when the discovery of the at least one different UE has a high priority or is urgent; and
   waiting until the MM back-off timer expires, and thereafter transmitting to the at least one different UE the discovery signal including the proximity service code on a resource allocated from the base station, when the discovery of the at least one different UE does not have the high priority or is not urgent.

6. The UE of claim 5, wherein in order to transmit to the at least one different UE the discovery signal including the proximity service code on the randomly selected resource, the processor is configured to perform:
   determining whether a validity timer of the proximity service code expires, when the discovery of the at least one different UE has a high priority or is urgent;
   determining whether the UE is located in a valid area of the proximity service code, when the validity timer does not expire;
   randomly selecting the resource on the basis of the common resource pool included in the system information to be broadcast from the base station; and
   transmitting to the at least one different UE the discovery signal including the proximity service code on the randomly selected resource.

7. The UE of claim 5, wherein the processor is configured to perform:
   transmitting a discovery request message to a proximity service server; and
   receiving a response message for the discovery request message, wherein the response message includes information regarding the proximity service code, the validity timer, and the valid area.

8. The UE of claim 5, wherein the MM back-off timer is expressed by T3346 as a back-off timer.

* * * * *